(12) United States Patent
Ocampo et al.

(10) Patent No.: US 11,270,414 B2
(45) Date of Patent: Mar. 8, 2022

(54) METHOD FOR GENERATING A REDUCED-BLUR DIGITAL IMAGE

(71) Applicant: INSTITUT MINES TELECOM, Palaiseau (FR)

(72) Inventors: Cristian Felipe Ocampo, Paris (FR); Yann Gousseau, Paris (FR); Said Ladjal, Palaiseau (FR)

(73) Assignee: INSTITUT MINES TELECOM, Palaiseau (FR)

( * ) Notice: Subject to any disclaimer, the term of this patent is extended or adjusted under 35 U.S.C. 154(b) by 10 days.

(21) Appl. No.: 16/554,660

(22) Filed: Aug. 29, 2019

(65) Prior Publication Data

US 2021/0065336 A1 Mar. 4, 2021

(51) Int. Cl.
*G06T 5/00* (2006.01)
*G06T 5/50* (2006.01)

(52) U.S. Cl.
CPC ........... *G06T 5/003* (2013.01); *G06T 5/50* (2013.01); *G06T 2207/20221* (2013.01)

(58) Field of Classification Search
CPC .. G06T 5/003; G06T 5/50; G06T 2207/20221
USPC ........................................ 382/254
See application file for complete search history.

(56) References Cited

U.S. PATENT DOCUMENTS

| 2011/0158541 A1* | 6/2011 | Watanabe | G06T 5/003 382/195 |
| 2017/0186144 A1* | 6/2017 | Chien | G06T 5/002 |
| 2020/0051265 A1* | 2/2020 | Kim | H04N 5/23287 |

* cited by examiner

*Primary Examiner* — Ayodeji O Ayotunde
(74) *Attorney, Agent, or Firm* — Oblon, McClelland, Maier & Neustadt, L.L.P.

(57) ABSTRACT

A method for generating a reduced-blur digital image representing a scene, the method being computer-implemented and comprising the following successive steps:
i) providing at least two digital source images, a same element of the scene being represented in at least two source images,
ii) selecting a reference image among the source images,
iii) for at least one source image different from the reference image, and for at least one pixel of the reference image,
a) defining a pattern in the reference image comprising pixels of the reference image, the element being represented in said pattern,
b) constructing a map of coordinates that associates coordinates of the pattern in the reference image with the coordinates of the most similar pattern in the source image,
c) optionally, filtering of the map of coordinates, and
d) generating a corrected image by assigning to a pixel of the corrected image, the position of the pixel of the reference image and a color extracted from the source image point which position is defined by the, optionally filtered, map of coordinates,
iv) generating the reduced-blur image by processing, with a multifocus image fusion technique, the corrected image(s) and the reference image.

19 Claims, 5 Drawing Sheets

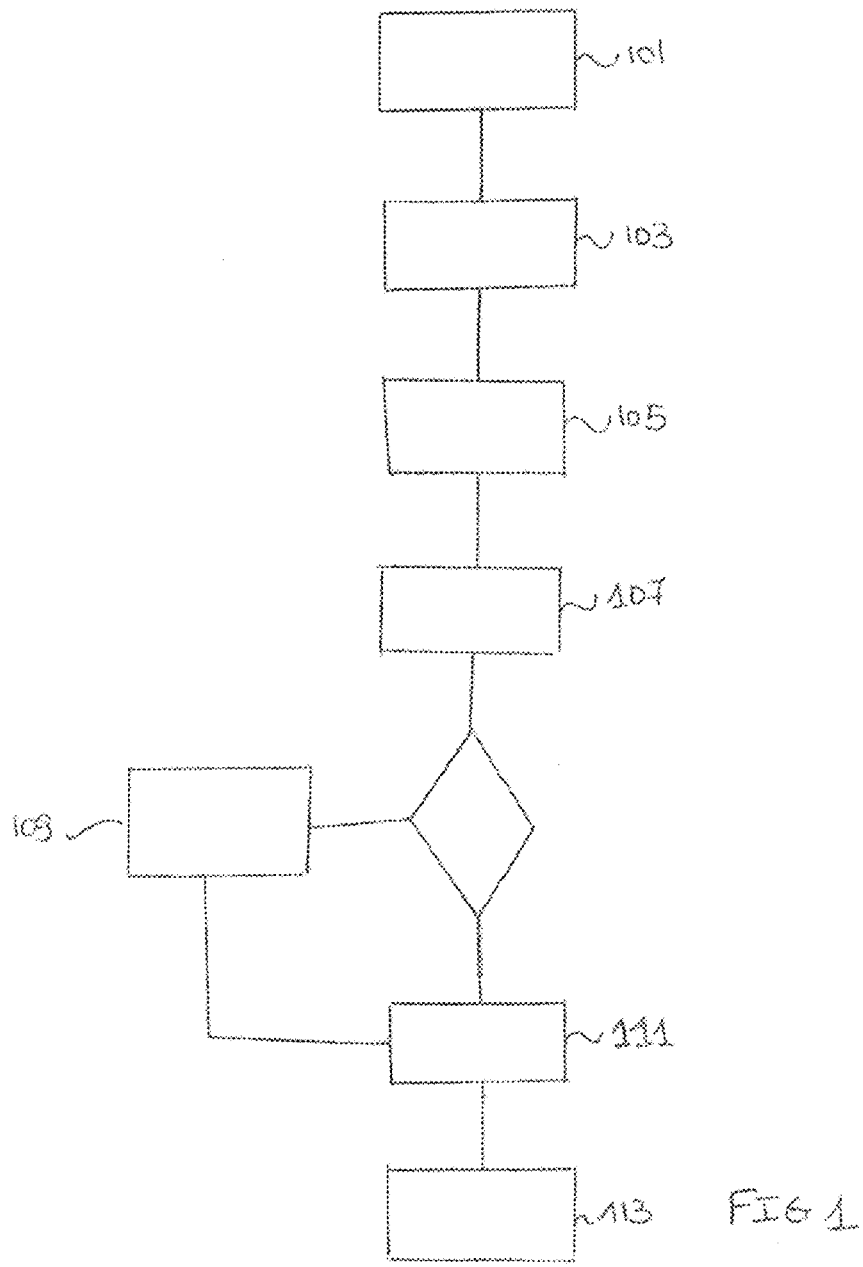

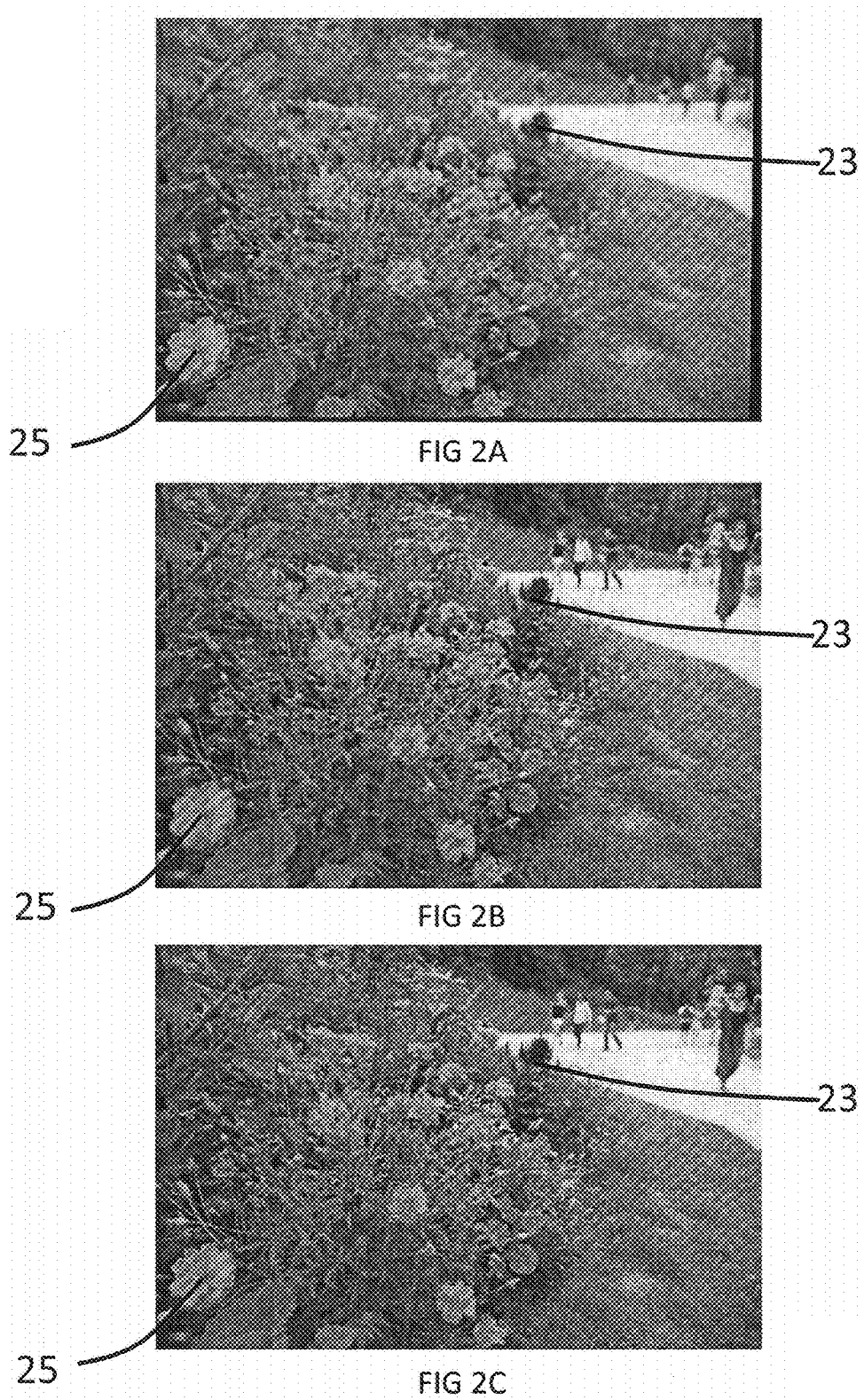

METHOD FOR GENERATING A REDUCED-BLUR DIGITAL IMAGE

The present invention relates to the field of digital photography, notably the field of image processing, in particular the field of image fusion.

DESCRIPTION OF THE RELATED ART

Imaging devices such as cameras usually have a limited depth of field and objects in a scene acquired by such imaging devices that are outside the field are out of focus and appear blurred to the observer. This is a well-known issue with large camera sensors, large apertures and macro photography.

One solution to generate a digital image having an increased depth of field consists in acquiring several digital images of the scene, each image being acquired with a different focus, and in merging the images in a subsequent step to produce a reduced-blur image which substantially comprises the sharpest portions of each image used in the merging process. This merging technique is referred to as multi-focus image fusion, named as MFIF in the following.

Most MFIF techniques rely on two steps: the sharpest regions in each image are first identified, before being merged altogether into a final image. The MFIF techniques differ however on the way the sharp information is extracted from the images, and on how to merge such extracted information.

A strong limitation of the existing MFIF methods is their difficulty to deal with motion, be it camera shake or motion due to moving objects in the scene.

A classical way to reduce the influence of camera shake is to register the images before the merging step. However, this approach fails when the scene is not planar or when the camera has moved away from its optical center, which is very common in practice and yields mis-registrations. As a result, artefacts are produced in the reduced-blur image which can be easily identified by an observer. MFIF methods working at pixel level are particularly exposed to these errors. MFIF region based methods are more robust to small mis-registration errors, but to a limited extent. Moreover, none of these methods is able to deal with moving objects.

In a different direction, and still to deal with motion, several solutions have been proposed, for instance using image matting techniques, such as in the article of Shutao Li, Xudong Kang, Jianwen Hu, and Bin Yang, "*Image mailing for fusion of multi-focus images in dynamic scenes,*" Information Fusion, vol. 14, no. 2, pp. 147-162, 2013) or through the use of dense Scale-Invariant Feature Transform (SIFT)) descriptors, as explained in the article of Yu Liu, Shuping Liu, and Zengfu Wang, "*Multi-focus image fusion with dense SIFT,*" Information Fusion, vol. 23, pp. 139-155, 2015. These methods attain a better robustness to mis-registration errors or to object motions. However, they are all based under the hypothesis that all the objects are exactly the same in the images to be merged. For this reason, they cannot deal with non-rigid deformations or strong mis-registrations.

More generally, none of the methods in the literature can ensure the global geometrical consistency of the result and prevent the formation of artefacts in the reduced-blur image, in case of moving objects or moving camera.

It is desirable to have a MFIF method that obviates all or part of the abovementioned drawbacks.

SUMMARY OF THE INVENTION

Exemplary embodiments of the invention aim at fulfilling this need and relate to a method for generating a reduced-blur digital image representing a scene, the method being computer-implemented and comprising the following successive steps:

i) providing at least two digital source images, a same element of the scene being represented in at least two source images, ii) selecting a reference image among the source images, iii) for at least one source image different from the reference image, and for at least one pixel of the reference image,
  a) defining a pattern in the reference image comprising pixels of the reference image, the element being represented in said pattern,
  b) constructing a map of coordinates that associates coordinates of the pattern in the reference image with the coordinates of the most similar pattern in the source image,
  c) optionally, filtering the map of coordinates, and
  d) generating a corrected image by assigning to a pixel of the corrected image, the position of the pixel of the reference image and a color extracted from the source image point which position is defined by the, optionally filtered, map of coordinates, iv) generating the reduced-blur image by processing, with a multifocus image fusion technique, the corrected image(s) and the reference image.

The invention easily deals with motion, be it camera shake or motion due to moving elements in the scene. It enables to merge images of a specified scene, each image locally exhibiting a distinct amount of blur, into a sharp image, even in the presence of moving objects in the scene and of camera shake. Furthermore, it reduces the occurrence of artefacts in the reduced blur image as compared to the prior art.

More particularly, the method according to the invention presents the following advantage as compared to known methods in the related art. It can generate a reduced-blur image from at least a part of, preferably all, the available information contained in the source images, including when elements have moved inside the scene, between the acquisition times of the different source images. This was almost impossible to obtain with the methods of the prior art without generating artefacts in the merged image.

The method can account for complementary and potentially redundant information from the source images to generate the reduced-blur image that contains a better description of the scene than any of the individual source images, in particular when elements of the scene have moved or the imaging sensor that acquired the image has moved between the acquisition of the source images.

Still further, the proposed method makes it possible to use any MFIF technique at step iv). Hence the invention enables to adapt the MFIF to cases where objects are moving, or where accurate image registration is out-of-reach.

The invention has applications in many fields wherein the ability to obtain a sharp image is beneficial. These applications include remote sensing, biomedical imaging, computer vision and defence system which all profit from the inclusion additional texture/detail information on the objects.

In the description, unless otherwise stated, an image is digital, i.e. it is defined by an intensity $I(x,y)$ at a pixel located in position $(x,y)$, the intensity being a color, for instance defined in a RGB space or a CMYK referential, or a gray level.

The term "pattern" refers to a portion extracted from a source image. One pattern is notably part of the reference image.

To be recognized, the pattern may cover a few pixels up to a significant amount. For example a pattern may cover at least 1%, preferably between 90% and 100% of the surface of each source image, in particular of the reference image.

The pattern may have a size larger or equal to 2 pixels, larger than or equal to 9, larger than or equal to 16, larger than or equal to 25.

The pattern can have a rectangular, notably square, shape.

The term "reduced blur image" refers to an image wherein the total surface of the sharp zones is greater than any of the individual source images.

The term "scene" corresponds to a part of an environment that can be observed by an imaging sensor when it is stationary at a given acquisition location. A scene may include at least one, preferably more than one, elements. The element may be a structure, for example a bridge or a tunnel, a building, a house, a stadium, a ship, a warehouse, an urban furniture such as a bus shelter, an ornamental item, a road sign, a traffic light, a wall, a wall for example of a gallery, or a part thereof. The element may be a natural element, for example a tree, a rock, a mountain, a wall of a cave, a cloud. It can be an animal or a human being.

The term "multifocus image fusion" or (MFIF) refers to a process of merging information of two or more source images of a scene and as a result has an image, which is at least as sharp as any source image. Examples of suited MFIF techniques can be found in Li, Shutao, et al., "*Pixel-level Image Fusion: A survey of the state of the art*", Information fusion 33:100-112, (2017).

According to some embodiments, the reference image may be the sharpest of the source images. Using the sharpest image as a reference facilitates the subsequent motion correction during the fusion process.

The element may be chosen from at least a portion of an object, an animal, a human being, a plant, a tree, a building, a landscape, for example a cloud, a hill or a mountain.

The most similar pattern may be, among a predetermined set of patterns in the source image, the pattern that optimizes a function dependent on at least one digital data associated with said pattern and on at least one digital data associated with the pattern of the reference image.

In a preferred embodiment, in step iii)b), the most similar pattern may be, among a predetermined set of patterns of the source image, the pattern that minimizes a function expressing the difference between digital data associated with said pattern and digital data associated with the pattern of the reference image.

The digital data may comprise values of at least one color coded in a color space.

In some embodiments, the digital data further comprises the gradient orientation of the pattern. Such data may help to pair patterns around edges as these patterns have a very discriminative map of directions.

Still further, the digital data may comprise a pattern local descriptor. Preferably, the pattern local descriptor is a SIFT descriptor. An example of a suitable SIFT descriptor is described in the article Yu Liu, Shuping Liu, and Zengfu Wang, "*Multi focus image fusion with dense SIFT,*" Information Fusion, vol. 23, pp. 139-155, 2015. SIFT descriptors may add robustness to blur and geometrical distortions.

Step iii) may be implemented for several patterns of the reference image, said patterns covering together more than 90% of the surface of the image. Preferably said patterns cover together the entire surface of the image.

The method, may comprise, prior to step iii)a):
the computation of a multiscale representation of a reduced reference image and a reduced source image, by decreasing the respective resolutions of the reference image and the source image such as to obtain reduced reference and source images respectively; and for a pattern of the reduced reference image representing the element:
searching, in the reduced source image, for the pattern most similar to the pattern of the reduced reference image, and
determining the predetermined set of patterns of the source image from the position of the most similar pattern in the reduced source image.

By using reduced reference and source images, one may ensure that the reconstructed image does not exhibit unpleasant artificial discontinuities.

The reduced reference image and the reduced source image may be respectively images within a pyramid of the reference image and the source image.

The pyramid, that may be Gaussian, is used as an instrument that helps the method to improve the quality of the reduced-blur image.

In step iv), the reduced-blur image may be generated by assigning, to at least one pixel of a zone of said reduced-blur image, the color assigned to at least one matching point of a reduced-blur zone.

Preferably, the reduced-blur zone is the sharpest zone among all zones of the corrected image(s) and the reference image having the same coordinates as the zone of the reduced-blur image.

In step iv), the reduced-blur image may be generated by processing the corrected image(s) and the reference image with a multifocus image fusion technique.

In step iii)c), the filtering of the map of coordinates may be implemented with a Gaussian-like filter. By filtering the map of coordinates, one can ensure that the later does not exhibit a significant jitter, in particular for regions where the reference image is blurry.

The invention also relates to a computer program product comprising instructions which, when the program is executed by a computer, causes the computer to carry out the steps of the method according to the invention.

The present invention further includes a computer-readable storage medium comprising instructions which, when executed by a computer, causes the computer to carry out the steps of the method according to the invention.

Exemplary embodiments of the present invention also relate a device comprising means for carrying out the steps of the method of the present invention.

The means may comprise a memory storage unit, a set of instructions and a processor for executing said set of instructions, such as a PC computer or a dedicated microcontroller.

The device may comprise a camera which comprises an imaging sensor for acquiring the source images.

The device may comprise a storage unit for storing the source images.

It is to be understood that both the general description above and the detailed description below are exemplary only and are not restrictive of the scope of the invention.

BRIEF DESCRIPTION OF THE DRAWINGS

The accompanying drawings, which are incorporated therein and constitute a part of the specification, illustrate preferred embodiments of the invention, and together with the description, aim at explaining the principles of the invention. In the drawings:

FIG. 1 is a schematic of one embodiment of a method according to the invention,

FIGS. 2A and 2B show an example of source images usable to implement a method for generating a reduced-blur digital image according to some embodiments, FIG. 2C shows a reduced-blur image resulting from the method according to some embodiments using the images illustrated in FIGS. 2A and 2B, FIGS. 3A and 3B show an example of source images usable to implement a method for generating a reduced-blur digital image according to some embodiments.

Whenever possible, the same reference numbers will be used throughout the drawings to refer to the same or like parts.

Figure 3A:
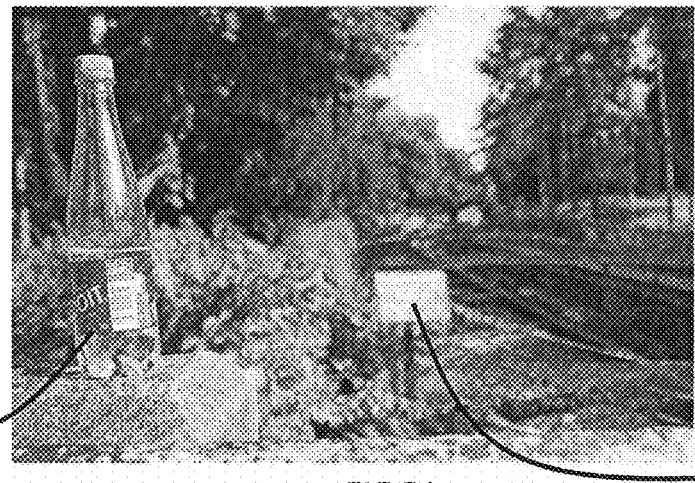
FIG. 3C shows a reduced-blur image resulting from the method according to some embodiments using the images illustrated in FIGS. 3A and 3B, FIGS. 4A and 4B show an example of source images usable to implement a method for generating a reduced-blur digital image according to some embodiments.

In accordance with the invention, and as broadly embodied, a method according to the present invention is provided, aiming at generating a reduced-blur digital image representing a scene.

First, at step 101, several digital source images $I_L$ are acquired by a camera comprising an imaging sensor, L varying from 1 to N with N being the number of different digital source images. A same element of the scene is represented in at least two source images $I_L$, preferably in each source image $I_L$. Example images comprising same elements are shown in FIGS. 2A-2B, FIGS. 3A-3B and FIGS. 4A-4B respectively.

The source images $I_L$ may be recorded on a storage computer medium, for example a hard disk or a memory of the SSD or Flash type.

For instance, elements are chosen from at least a portion of an object, an animal, a human being, a plant, a tree, a building, a landscape, for example a cloud, a hill or a mountain.

The digital sources image may be produced using a same imaging sensor or using several imaging sensors, as long as the radiometry is similar.

Preferably, the imaging sensor is a matrix imaging sensor.

The source images $I_L$ may be of arbitrary size, for example 200×200 or 500×500 or 700×1000 pixels, or even larger.

The imaging sensor may be, for example, a CCD, CID or CMOS imaging sensor.

As shown in FIGS. 2A, 2B, 3A, 3B, 4A and 4B, the digital source images have different levels of blur. For instance, element 23 in image 2A is blurred whereas it is sharply represented in image 2B. On the contrary, element 25, which is closer to the objective of the camera is sharply represented in the image of FIG. 2A, whereas it is blurred in the image of FIG. 2B. The same goes for elements 35 and 45 in the couples of images 3A; 3B and 4A, 4B respectively.

At step 103, a reference image $I_R$ among the source images is first selected. This reference image $I_R$ serves as geometrical reference for reconstructing the reduced blur image F.

In a preferred embodiment, the reference image $I_R$ corresponds to the sharpest image among the source images $I_L$.

A sharpness measure can be characterized using several mathematical tools. For example, a sharpness measure may be computed through various differential operators. Preferably, a measure of sharpness of a source image $I_L$ at a pixel x is computed using a local total variation.

$$S_L(x) = LTV_\sigma(I_L)(x) = (\|\nabla I_L\| * K_\sigma)(x)$$

where σ is a parameter that governs the locality of the measure, ∇ designates the gradient operator, and K is a Gaussian kernel whose standard deviation is σ. The parameter σ may range from 3 to 8, for example is equal to 5.

This sharpness measure S may be replaced by any other adapted measure. For example, the measure of sharpness S may also be estimated through spatial frequency, drawing on wavelet decompositions, or through the use of a convolutional neural network.

The next steps 105 and 107 consist in creating new images $J_L$ from the source images $I_L$ by relying on the geometrical content of the reference image $I_R$. It is useful in the sense that it facilitates the patterns matching between the source images and the reference image.

At step 105, for at least one source image $I_L$ different from the reference image $I_R$, preferably for all source images $I_L$, L varying from 1 to N, different from the reference image and for at least one pixel of the reference image, a pattern is defined in the reference image.

In the following, the method is presented for a single source image different from the reference image. However, it can be generalized to any number of source images.

Figure 5:
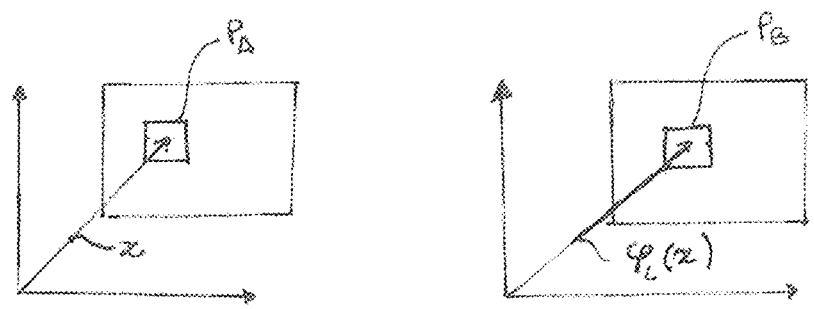
FIG. 5 illustrates the position of a pattern in the reference image and the position of the most similar pattern in the source image.

At step 107, a map of coordinates $\varphi_L$ is constructed. This map of coordinates $\varphi_L$ associates coordinates of the pattern in the reference image $I_R$ with the coordinates of the most similar pattern in the source image, as shown in FIG. 5. The map of coordinates $\varphi_L$ may be computed so as to minimize a quantity that depends on the difference Dx between the at least one pattern $P_A(x)$ centered at the at least one pixel x in the reference image $I_R$ and patterns $P_B$ of the source image $I_L$:

$$D_x(P_A(x), P_B(\varphi_L(x)))$$

An optimization may be conducted in order to find the location $\varphi_L(x)$ of the pattern $P_A$ in the source image that is most similar to the pattern $P_B$ in the reference image at x.

To that end, the optimization can be achieved by any method to match the patterns of the respective source and reference images, including approximate neighbor search methods.

The pattern $P_B(\varphi_L(x))$ corresponds by definition to the most similar pattern to $P_A(x)$ in the source image, once the map of coordinates φ is computed.

The distance Dx may depend on the difference between digital data associated with said pattern and digital data associated with patterns of the reference image.

The digital data comprises values of at least one color coded in a color space.

The color may be a gray level. As a variant, it may be coded in a RGB space or in a CYMK space.

The digital data may further comprise the gradient orientation of the pattern and a pattern local descriptor.

The distance $D_x$ may be expressed as the combination of three terms:

$$D_x = \lambda_1 \|\mu(P_A(x)) - \mu(P_B(\varphi_L(x)))\|^2 + \lambda_2 \|\theta_A(x) - \theta_B(\varphi_L(x))\|^2 + \lambda_3 \|R_A(x) - R_B(\varphi_L(x))\|^2 \quad (I)$$

where $\mu(P_A(x)) \in R^3$ is the average color of a pattern $P_A$ around x, $\theta_A(x) \in R^{2M}$ is the vector made of the unit normalized gradient (gradient divided by its amplitude) in an M-pixel neighborhood of x, $R_A(x)$ is a SIFT descriptor extracted around x in image A and $\lambda_1$, $\lambda_2$ and $\lambda_3$ are scalar values.

The first term of equation (1) is robust to noise and blur as the average value within a patch does not change when it is blurred. The second term helps to pair patches around edges as these patches have a very discriminative map of directions. The third term comprising the SIFT descriptor, adds robustness to blur and geometrical distortions.

Preferably, the map of coordinates $\varphi_L$ is computed for all pixels of the reference image. In this case, the quantity to be minimized can depend on the sum of the differences Dx of all pixels x:

$$\Sigma_x D_x(P_A(x), P_B(\varphi_L(x)))$$

In order to improve the definition of the reduced-blur image, a multiscale step can be performed which comprises reducing the respective resolutions of the reference images and the source images, and for a pattern of each of the so-obtained reduced reference image representing the element:

searching, in the reduced source image, for the pattern most similar to the pattern of the reduced reference image, and determining a predetermined set of patterns of the source image from the position of the most similar pattern in the reduced source image.

For instance, the source image may consist in a 2P*2Q pixels sized image, P and Q being integer numbers, and the reduced image is a P*Q pixels sized image, each pixel of the reduced size image being obtained by averaging the data of the corresponding 2*2 pixels size pattern in the source image or any other down-sampling technique.

The multiscale step can be performed iteratively. In other words, the multiscale step can comprise reducing successively the respective resolutions of higher resolution reference and source images, for instance the reduced reference and source images, such as to obtain lower-scale reference and source images. This improves the search of the most similar pattern at the higher scale by using the result of the search at the lower scale as an initial guess.

For instance, the reduced reference image and the reduced source image are respectively images of a pyramid of the reference image and the source image.

The lower scale and higher scale images can define pyramids of images.

In some embodiments, the map of coordinates at the end of step iii)b) can be filtered. The method may then comprise an additional step iii)c) 109. Preferably, at step 109, the filtering of the map of coordinates is implemented with a Gaussian-like filter. The filtered map may be obtained using the following equation:

$$\hat{\varphi}(x) = x + \frac{1}{Z(x)} \sum_{|t|<s} (\varphi(x+t) - (x+t))\omega_x(t)$$

$$\omega_x(t) = e^{-\frac{\|\varphi(x+t)-(\varphi(x)+t)\|^2}{2\sigma^2}}; Z(x) = \sum_t \omega_x(t)$$

At step 111, a corrected image $J_L(x)$ can be generated by assigning to a pixel of the corrected image, the position of the pixel of the reference image and a color extracted from the source image point which position is defined by the optionally filtered map of coordinates.

$$J_L(x) = I_L(\varphi_L(x))$$

Once the corrected image is generated, the reduced-blur image can be obtained at step 113 by processing, with a multifocus image fusion technique, the corrected image $J_L$ and the reference image $I_R$. To that end, one may assign to at least one pixel of a zone of said reduced-blur image, the color assigned to at least one a matching point of a reduced-blur zone. The reduced-blur zone may correspond to the sharpest zone among all zones of the corrected image(s) and the reference image having the same coordinates as the zone of the reduced blur-image.

Preferably, the reduced-blur image is obtained by assigning for all pixels of said reduced-blur image, the color assigned to the sharpest pixel of the corrected image(s) and the reference image having the same coordinates as the pixel of the reduced blur image.

The reduced-blur image F can be built as follows:

$$F(x) = I_k(x) \text{ where } k = \text{argmax}_L S_L(x)$$

Where $S_L(x)$ is the sharpness measure of image $I_K$ at pixel x. As stated above, the sharpness measure $S_L(x)$ is preferably the local total variation.

The Laplacian pyramid of the fused image F can be built as follows:

$$\mathcal{L}_n(F) = \sum_{L=1}^{N} g_n(W_L) \mathcal{L}_n(I_L)$$

where $\mathcal{L}_n$ is the level n of the Laplacian pyramid and $g_n$ the Gaussian one, weights $W_k$ attached to image $I_k$ are an indicator of whether the image $I_L$ is the sharpest of the plurality of images, thus $W_k(x) = 1$ if $k = \text{argmax}_L S_L(x)$.

Then from the Laplacian Pyramid, the reduced-blur image is generated.

Figure 3B:
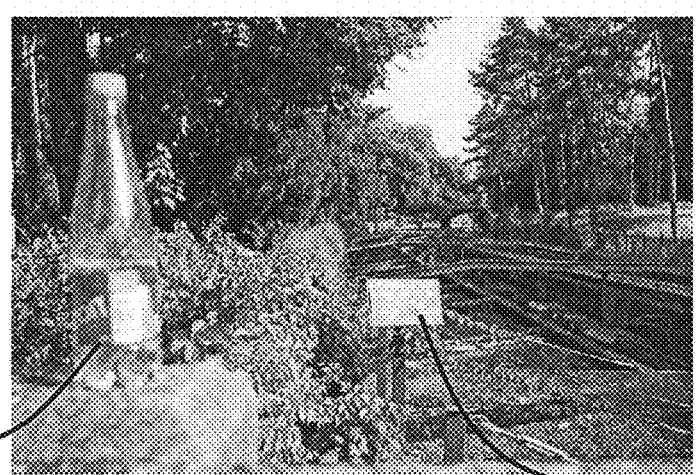
Figure 3C:
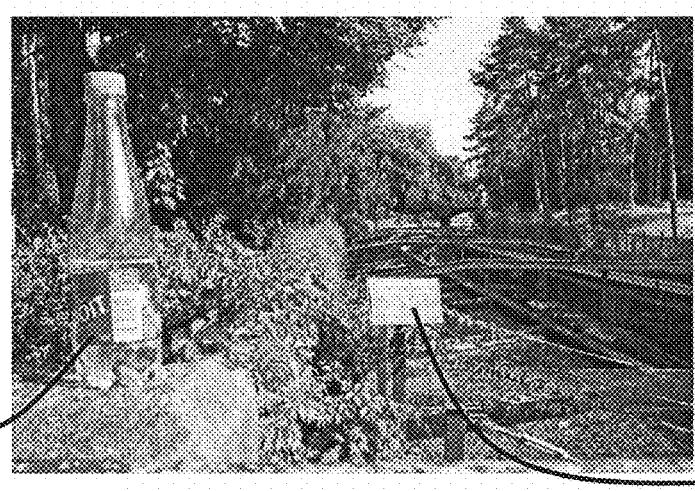
Figure 4A:
FIG. 4C shows a reduced-blur image resulting from the method according to some embodiments using the images illustrated in FIGS. 4A and 4B.
Figure 4B:
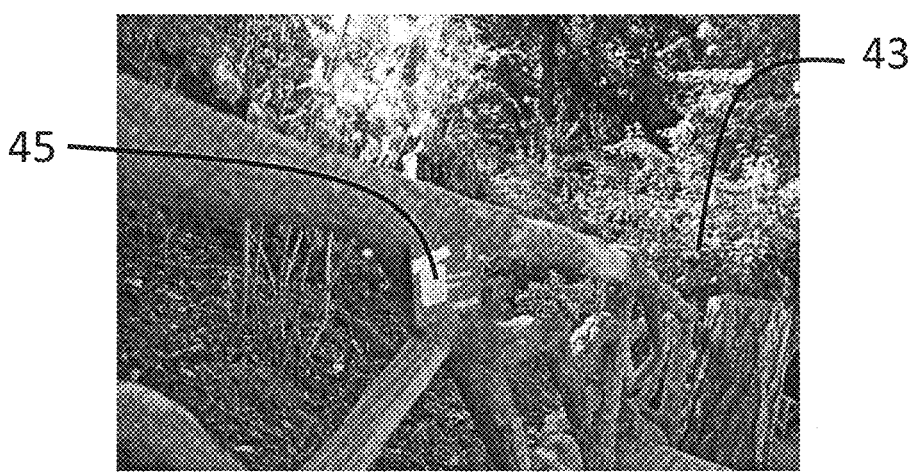
Figure 4C:

Examples of reduced-blur images obtained using the method according to the present invention are illustrated in FIGS. 2C, 3C and 4C.

The images illustrated in FIGS. 2C, 3C and 4C are generated using couplings between FIGS. 2A; 2B, FIGS. 3A, 3B and FIGS. 4A; 4B respectively.

One can see for instance, that in FIG. 2C elements 23 and 25 are both sharply represented in FIG. 2C whereas they appear either sharp or blurred in FIGS. 2A and 2B, considered independently.

Moreover, as it can be observed on FIG. 2C, the method of the invention takes into account for moving elements. People have moved between the acquisition instants of FIGS. 2A and 2B, as it can be observed on the upper right part of the images, and the method has accounted for said move without generating any artefact, as observed in FIG. 2C.

The same goes for images in FIGS. 3C and 4C, wherein elements referred by numbers 33, 35, 43 and 45 all appear sharper in FIGS. 3C and 4C than in the source images considered independently.

The invention is not limited to the described embodiments, and various variations and modifications may be made without departing from its scope.

The invention claimed is:

1. A method for generating a reduced-blur digital image representing a scene, the method being computer-implemented and comprising the following successive steps:
   i) providing at least two digital source images, a same element of the scene being represented in at least two source images,
   ii) selecting a reference image among the source images, iii) for at least one source image different from the reference image, and for at least one pixel of the reference image,
  a) defining a pattern in the reference image comprising pixels of the reference image, the element being represented in said pattern,
  b) constructing a map of coordinates that associates coordinates of the pattern in the reference image with the coordinates of the most similar pattern in the source image,
  c) optionally, filtering of the map of coordinates, and
  d) generating a corrected image by assigning to a pixel of the corrected image, the position of the pixel of the reference image and a color extracted from the source image point which position is defined by the, optionally filtered, map of coordinates,
iv) generating the reduced-blur image by processing, with a multifocus image fusion technique, the corrected image(s) and the reference image.

2. The method according to claim 1, the reference image being the sharpest of the source images.

3. The method according to claim 1, wherein the most similar pattern is, among a predetermined set of patterns in the source image, the pattern that optimizes a function dependent on at least one digital data associated with said pattern and on at least one digital data associated with the pattern of the reference image.

4. The method according to claim 1, wherein in step iii)b), the most similar pattern is which, among a predetermined set of patterns of the source image, the pattern that minimizes a function expressing the difference between digital data associated with said pattern and digital data associated with the pattern of the reference image.

5. The method according to claim 4, the digital data comprising values of at least one color coded in a color space.

6. The method of claim 5, wherein the digital data further comprising a gradient orientation of pattern and/or a pattern local descriptor.

7. The method according to claim 1, wherein step iii) is implemented for several patterns of the reference image, said patterns covering together more than 90% of the surface of the image.

8. The method according to claim 7, wherein said patterns covering together an entire surface of the image.

9. The method according to claim 3, comprising, prior to step iii)a):
  the computation of a multiscale representation of the reference image and of the source image, by decreasing respective resolutions of the reference image and of the source image such as to obtain reduced reference and source images respectively; and
  for a pattern of the reduced reference image representing the element:
    searching, in the reduced source image, for the pattern most similar to the pattern of the reduced reference image, and
    determining a predetermined set of patterns of the source image from the position of the most similar pattern in the reduced source image.

10. The method according to claim 9, wherein the multiscale representation of reference image and of the source image are obtained using a pyramid transform.

11. The method according to claim 10, the pyramid being a Gaussian pyramid.

12. The method of claim 1, wherein in step iv), the reduced-blur image is generated by assigning, to at least one pixel of a zone of said reduced-blur image, the color assigned to at least one a matching point of a reduced-blur zone,
  the reduced-blur zone being the sharpest zone among all zones of the corrected image(s) and the reference image having the same coordinates as the zone of reduced blur-image.

13. The method according to claim 1, wherein in step iv), the reduced-blur image is generated by processing the corrected image(s) and the reference image with a multifocus image fusion technique.

14. The method according to claim 1, wherein in step iii)c), the filtering of the map of coordinates is implemented with a Gaussian-like filter.

15. The method according to claim 1, the element being chosen from at least a portion of an object, an animal, a human being, a plant, a tree, a building, a landscape, for example a cloud, a hill or a mountain.

16. A non-transitory computer-readable storage medium comprising instructions which, when executed by a computer, cause the computer to carry out the steps of the method of claim 1.

17. A device comprising means for carrying out the steps of the method of claim 1.

18. The device according to claim 17, comprising a camera for acquiring the source images.

19. The device according to claim 17, comprising a storage unit for storing the source images.

* * * * *